United States Patent [19]
Gardiner et al.

[11] 3,894,959
[45] July 15, 1975

[54] MIXED CARBOXYLIC ACID ESTERS AS ELECTRICAL INSULATING OILS

[75] Inventors: J. Brooke Gardiner, Moutainside; Harold Shaub, New Providence; Keith C. Tessier, Scotch Plains, all of N.J.

[73] Assignee: Exxon Research and Engineering Company, Linden, N.J.

[22] Filed: Oct. 17, 1972

[21] Appl. No.: 298,379

[52] U.S. Cl. ............ 252/69; 174/17 LF; 260/635 P
[51] Int. Cl. ............................................. H01b 3/18
[58] Field of Search .................. 252/64; 260/635 P; 174/17 LF

[56] References Cited
UNITED STATES PATENTS

| | | | |
|---|---|---|---|
| 3,066,171 | 11/1962 | Clunie et al. | 260/635 P X |
| 3,363,156 | 1/1968 | Cox | 317/259 |
| 3,740,625 | 6/1973 | Ross et al. | 252/64 X |

*Primary Examiner*—Benjamin R. Padgett
*Assistant Examiner*—P. A. Nelson
*Attorney, Agent, or Firm*—Byron O. Dimmick

[57] ABSTRACT

Esters made from $C_3$ to $C_6$ polyols having 2 to 4 hydroxyl groups and mixtures of monocarboxylic acids containing up to 50 mole % $C_7$ to $C_{14}$ aromatic acids and at least 50 mole % $C_4$ to $C_{14}$ aliphatic acid, and esters made from said acid mixtures and $C_8$ to $C_{40}$ polyol ethers containing at least 2 hydroxyl groups and at least 1 ether group are useful as insulating oils in electrical equipment.

10 Claims, No Drawings

MIXED CARBOXYLIC ACID ESTERS AS ELECTRICAL INSULATING OILS

FIELD OF THE INVENTION

This invention relates to a synthetic electrical insulating oil made by esterifying a mixture of monocarboxylic acids containing up to 50 mole % of aromatic acids and at least 50 mole % of aliphatic acids with a polyol having from 2 to 4 hydroxyl groups or with a $C_8$ to $C_{40}$ polyol ether containing at least 2 hydroxyl groups and at least 1 ether group.

BACKGROUND OF THE INVENTION

Electrical insulating oils are highly refined petroleum oils or synthetic liquids used in the operation of electrical equipment such as transformers, circuit breakers, capacitors, switches, cables, etc. These oils serve three basic functions, namely, the dissipation of heat generated in electrical service, the prevention of arcing between two conductors at high potential difference, and the furnishing of a high dielectric capacity. Among the major commercial oils are refined petroleum oil and polychlorinated biphenyl (PCB). Other electrical fluids used commercially include polybutenes, sulfur hexafluoride, and castor oil.

For several decades PCB insulating oils have been used in those applications that require nonflammability, reduced explosion hazards, high dielectric strength, and high oxidative and thermal stability. Annual U.S. production of PCB reaches a level of 42,500 short tons in 1970, about 50% of this production being used in electrical oil applications.

Although the high chlorine content of PCB serves to provide reduced explosion and fire hazards it also has some disadvantages. Unfortunately, PCB is a very long-lived chemical and it has accidentally found its way into commercial poultry and foodstuffs and into many species of wildlife. It has also been implicated in birth defects and egg shell thinning in birds. It is highly toxic to certain species of fish, sometimes at low concentrations of a few parts per billion. (See, for example, N.W. Moore, "Biologist," 1969, 16, p. 157.) There thus has existed a need for an electrical oil that will be a satisfactory replacement for PCB's and be free of undesirable properties of the latter.

It has now been unexpectedly found that certain polyesters can meet the exacting requirements of electrical insulating oils. Desirable properties of such polyesters include their very low toxicity toward flora and fauna, and their short persistence in the environment because of their biodegradability.

DESCRIPTION OF THE PRIOR ART

German Pat. No. 888,144 teaches insulating oils for electrical equipment comprising esters obtained by completely esterifying aliphatic alcohols having at least 3 carbons and 2 or more primary but no secondary or tertiary alcohol groups with fatty acids having at least 6 carbons.

U.S. Pat. No. 1,882,812 teaches the use of esters of starch or cellulose as additives for petroleum-based insulating oils.

U.S. Pat. No. 2,492,210 teaches the use of certain benzoate esters of monohydric alcohols as liquid dielectric materials.

U.S. Pat. No. 2,700,022 suggests sugar esters of aliphatic carboxylic acids as additives for hydrocarbon oil compositions used as electrical insulating oils.

U.S. Pat. No. 3,549,537 teaches that certain types of aromatics such as acenaphthene are effective in reducing the gassing tendency of petroleum-based electrical oils.

It has now been found that certain mixed aliphatic-aromatic carboxylic acid esters of certain polyhydric alcohols comprising polyols and polyol ethers are useful as electrical insulating oils.

SUMMARY OF THE INVENTION

The polyhydric alcohol esters of this invention are found to have a unique combination of properties required of an electrical oil. Their high flash and fire points render them relatively safe from a flammability viewpoint while at the same time their range of viscosities and their low pour points give them adequate fluidity characteristics for commercial application. Moreover, they have a high level of thermal and oxidative stability.

Regarding electrical properties, the polyhydric alcohol esters of this invention can be made to have high dielectric constants making them particularly suitable for capacitor use while retaining very low electrical conductivities. Their dissipation factors are reasonably low, and their gassing tendencies can be made comparable to the lowest found commercially. An unexpectedly low order of acute toxicity to fresh water fish together with biodegradability combines with the above-mentioned properties to render these esters of polyols and polyol ethers unique, nonpolluting electrical oils.

DETAILED DESCRIPTION OF THE INVENTION

One type of ester insulating oil of the present invention is made from aliphatic polyols having 2 to 4 hydroxyl groups and 3 to 6 carbon atoms. The polyols that can be used include: pentaerythritol, 1,2,6-hexane triol, neopentyl glycol, glycerol, etc. Especially preferred is pentaerythritol. The preparation of some polyols is described in Kirk-Othmer, Encyclopedia of Chemical Technology, Second Edition, Vol. 1, pp. 588–596, and in ACS Monograph 136, on pentaerythritols.

Other synthetic electrical insulating oils of this invention are made from polyol ethers containing from 8 to 40 carbon atoms and at least 2, preferably 6 to 12, hydroxyl groups. Such polyol ethers can be prepared by means well known in the art, e.g., catalytic dehydration of polyols with strong acids such as sulfuric acid or with basic catalysts such as alumina, as well as by the Williamson synthesis in which ethers are formed by the reaction of a metal alcoholate with a hydrocarbon derivative or a sulfate. For further description of methods of preparation see Kirk-Othmer, Encyclopedia of Chemical Technology, Second Edition, Vol. 8, pp. 474 and 475, and ACS Monograph 136. See also British Pat. No. 615,370 and U.S. Pat. No. 2,462,049.

An especially preferred class of polyol ethers employed in the present invention are the polypentaerythritols which are formed by etherification of one or more hydroxyl groups of pentaerythritol with additional pentaerythritol moieties. Polypentaerythritols include dipentaerythritol, tripentaerythritol, tetrapentaerythritol, pentapentaerythritol, heptapentaerythritol, octapentaerythritol, nonapentaerythritol, decapentaerythritol, similar higher pentaerythritols and mixtures thereof. Polypentaerythritol esters are esterification products of such polypentaerythritols. The polypentaerythritols which are esterified with the mixed monocarboxylic acids defined below may generally be represented by the following formula:

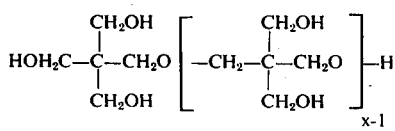

where $x$ equals 2 to 14, preferably from 2 to 5. Mixtures of polypentaerythritols can also be used. In these cases, $x$ will represent an average, and the value of $x-1$ may be a fraction or a mixed number as well as an integral number. The situation where $x$ equals 2 is particularly preferred, and in such a case the polyol is dipentaerythritol or mixtures of pentaerythritols having a major component of dipentaerythritol. Pentaerythritol itself is represented by the above formula where $x = 1$. Pentaerythritol and dipentaerythritol are conveniently referred to as PE and DIPE, respectively.

Pentaerythritol and various polypentaerythritols such as dipentaerythritol and tripentaerythritol are commercially available, as are mixtures of various lower pentaerythritols such as pentaerythritol with dipentaerythritol and/or tripentaerythritol.

A typical commercially available dipentaerythritol will have the following composition, as reported in J. Anal. Chem., Vol. 37, pp. 1361–1365, October 1965:

|  | Wt. % |
|---|---|
| Pentaerythritol monoformal | 0.84 |
| Pentaerythritol | 4.90 |
| Dipentaerythritol | 84.90 |
| Tripentaerythritol | 7.70 |
| Tris PE diformal | 0.69 |
| Tetrapentaerythritol | 1.20 |
| Bis DIPE monoformal | 0.33 |

While the polypentaerythritols represent the most commonly available polyol ethers useful in this invention, other polyol ethers that can be used include ditrimethylol propane, tritrimethylol ethane, trineopentyl glycol, etc. Ditrimethylol propane would have the structure:

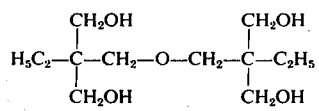

In practicing this invention one can use mixed polyhydric alcohols containing various amounts of at least such compounds as pentaerythritol, dipentaerythritol and tripentaerythritol. One can also use mixtures of polypentaerythritols containing higher polypentaerythritols mixed with pentaerythritol and with lower polypentaerythritols.

The mixture of polyhydric alcohols used to make the esters will depend somewhat on the final electrical application. For example, a capacitor oil requiring a relatively high dielectric constant of 5 to 7 would utilize a polyol-polyol ether mixture having a major proportion of dipentaerythritol, e.g., in the region of 50 to 100%, preferably 80 to 90%. On the other hand, an ester suitable as a transformer oil requiring a relatively low dielectric constant of 2 to 4 as well as a lower viscosity can utilize a mixed polyol-polyol ether having a large proportion of pentaerythritol, e.g., in the region of 50 to 100%, preferably 80 to 90%.

The esters of the present invention can be made by fully esterifying the above-described polyols and polyol ethers with a mixture of one or more aliphatic monocarboxylic acids of from 4 to 14 carbon atoms and one or more aromatic carboxylic acids of from 7 to 14 carbon atoms. The aliphatic monocarboxylic acids that can be employed in the present invention include the following:

a. straight chain acids such as butyric, heptanoic, valeric, caprylic, caproic, capric, lauric and myristic, as well as straight chain monoolefinically unsaturated acids such as 9-decylenic and 9-dodecylenic acids, which in some instances may give the added advantage of reducing the gassing tendencies of such esters.

b. branched chain acids such as 2-ethylhexanoic, 2-methylpentanoic, 2-methylhexanoic, 3-methylbutyric, 3-methylpentanoic, 3-ethylhexanoic, 3,3-dimethylbutyric, 2-ethylbutyric, 2-ethylpentanoic, 2-methyl-3-ethylpentanoic, 2,2-dimethylbutyric, 2-ethyl-3-methylbutyric, 4-methylpentanoic, 2-methylpropionic, 3-ethylpentanoic, 3-methylhexanoic, 2-methylbutyric, 2,2-methylpropionic, 2,3-dimethylbutyric, 2-ethyl-2-methylbutyric, 2-ethyl-4-methylpentanoic, 2,2,3,3-tetramethylbutyric, 2-isopropylpentanoic, and 2-isopropyl-3-methylbutyric.

The aliphatic acid portion of the mixed aromaticaliphatic acids can be a mixture, e.g., a mixture of aliphatic monocarboxylic acids ranging from $C_5$ to $C_{10}$, or mixed $C_5$, $C_7$, and $C_9$ acids, etc.

The $C_7$ to $C_{14}$ aromatic monocarboxylic acids that can be used to prepare the esters of the present invention include benzoic acid, toluic acid and anisic acid, veratric acid, 1-naphthoic acid, 2-naphthoic acid, etc. Acids wherein the carboxyl group is not directly attached to the aromatic group can also be used, such as phenyl acetic and beta-phenyl propionic acids. Other suitable aromatic acids include those having ether groups, e.g., 2-methoxy benzoic acid or 4-phenoxy benzoic acid. The aromatic acid portion of the mixed aliphatic-aromatic acids can comprise mixed acids, e.g., mixed benzoic-toluic acid.

In this invention, the above-described polyols or polyol ethers are substantially completely esterified with a mixture of up to 50 mole %, e.g., 5 to 50 mole % of the abovedescribed aromatic acids with at least 50 mole % of the abovedescribed aliphatic acids. The presence of the aromatic groups in the ester molecule gives the ester increased dielectric constants and reduced gassing tendencies when compared with esters containing only aliphatic groups. Most generally the mole percent of aromatic acids in the ester mixture will be within the range of about 1 to 30 mole %. When a relatively low dielectric constant is required, e.g., less than about 4, for use in transformers, for example, the aromatic acid content will be in the range of about 1 to 15 mole %, or more usually about 5 to 10 mole %. For applications where a relatively high dielectric constant is required, say greater than 4 (e.g., in capacitors) the aromatic acid content will be in the range of 5 to 50 mole %, preferably 5 to 30 mole %.

The esters of the present invention can be made by means well known to those who are skilled in the art. For example, they may be prepared by the reaction of a polyhydric alcohol with a slight excess of the above-described acids, the water being removed by volatilization preferably in the presence of an azeotropic agent such as a liquid hydrocarbon.

With pentaerythritol as the polyhydric alcohol, for example, slightly more than 4 moles of carboxylic acid are required for complete esterification of each mole of polyol, say between about 4.1 and 4.6 moles, preferably 4.2 to 4.5 moles. From about 2 to about 12 parts by weight of an azeotroping agent, preferably 2 to 10 parts, such as toluene, are added per 100 parts of reactant mixture. The azeotroping agent is preferably a hydrocarbon boiling between about 80° and 150°C. Among the preferred azeotroping agents in addition to toluene are xylene, cyclohexane, benzene and mixture of aliphatic hydrocarbons, such as petroleum naphtha. Esterification is generally carried out at atmospheric pressure, under reflux conditions at a temperature between about 140° and 350°C., preferably 205° to 220°C., i.e., about 400° to 430°F. The water is collected as it is formed, generally in an overhead Dean-Stark trap, with an azeotroping agent. The reaction is continued for about 4 to 20 hours until the hydroxyl number of the reaction product is below an equivalent of 10, preferably below an equivalent of 5, mg.KOH per gram of product.

After completion of the esterification reaction, the pressure in the reaction vessel is lowered to about 5 to 25 mm. of mercury, absolute, and the product is stripped at a temperature up to about 425°F. to remove the azeotroping agent and excess acid. The total acid number (TAN) as measured by ASTM D-664 should be less than 20, preferably less than 10 in order to avoid emulsion formation and local overheating during the subsequent washing steps or neutralization with lime.

After stripping, the ester is washed with aqueous caustic solution and then with aqueous sodium chloride solution and finally vacuum stripped to remove water. Other methods of reducing the acid content can be used, such as washing with sodium carbonate solution, stirring with an alkaline material, such as calcium oxide, sodium carbonate or potassium carbonate or treatment with an ion exchange resin.

The dehydrated product can then be treated with decolorizing charcoal, if necessary, and finally filtered through diatomaceous earth. Esterification catalysts such as strong acids, e.g., toluene sulfonic acids, sulfuric acid, etc., can be used to prepare the esters of this invention. Their use usually requires a washing step to remove the acid catalyst and a neutralization step followed by a water washing to remove traces of alkaline neutralization agent. It is often preferred to dispense with the acid catalyst and instead add activated carbon in the range of 1 to 5% by weight (based on the ester), preferably 2 to 3 wt. %. The activated carbon appears to provide a high surface area for reaction (esterification) to occur and also reduces color bodies.

After esterification, the reaction product is normally stripped at reduced pressure to remove solvent and unreacted starting materials. The oil, after filtration, has a total acid number (ASTM D-664) of <0.5, preferably <0.1, a hydroxyl number of <10, preferably <5 (mg. KOH/g of product).

In a preferred embodiment of the present invention, the synthetic esters are treated by percolation over granular solids such as clay. Suitable adsorbent solids include 3A and 4A molecular sieves, bauxite, silica gel, activated carbon, calcined magnesite, fluorosil and activated alumina. The preferred absorbent solid is Attapulgus clay. To obtain a high degree of adsorptivity the clay is heated in a dry nitrogen atmosphere to 400° to 600°F., preferably 450° to 550°F. for a period of 15 to 25 hours, preferably 18 to 22 hours. The clay is allowed to cool to room temperature in an atmosphere of dry nitrogen and the ester is then percolated through the bed.

In another preferred embodiment the synthetic aliphatic esters of this invention are used in conjunction with aromatic compounds of the type disclosed in U.S. Pat. No. 3,549,537. These aromatic hydrocarbons reduce the tendency of the electrical oils to evolve hydrogen gas when under electrical stress. Representative examples of such aromatic compounds include: acenaphthene, acenaphthylene, 1-methyl acenaphthene, 1-dodecyl acenaphthene, 3-tetrapropylene acenaphthene, 1-n-butyl acenaphthene, 1-methyl acenaphthylene, 1-dodecyl acenaphthylene, 3-hexyl acenapthylene, 1-phenyl acenaphthene, and 3-phenyl acenaphthene. The cyclic hydrocarbon additives are used in amounts ranging between about 0.5 and about 20.0 wt. %, preferably between about 1% and about 10 wt. %, based on the total weight of the oil composition.

Insulating oils must have a low gas content; otherwise bubbles form in the oil and the gas in them ionizes at high voltages. Electrochemical changes in the insulating oil which take place in service may result in gas evolution or gas absorption, depending on the oil composition and the surrounding conditions. Accordingly, the final preparation of an insulating oil prior to use in a transformer or capacitor is a degassing step carried out under reduced pressure, e.g., at about 20 microns at 122° to 212°F. This high vacuum can result in removal of acenaphthene by volatilization. Therefore, a less volatile aromatic such as an alkyl-substituted acenaphthene should preferably be used in this case. Alternatively, aromatic substitution by esterification with an aromatic acid can retain the aromatic molecule during the degassing step.

The ester oils of the present invention are especially useful as dielectric media in capacitors. Such oils desirably have high dielectric constants, e.g., greater than 4, and low power losses in order to store electrical energy and to minimize electrical loss during service. Power losses or dissipation factors in the range of about 0.001 to 0.004 tan delta at 1000 volts and 60 Hertz at 212°F. meet this requirement. It is also desirable that capacitor oils have high dielectric strengths (30–35 Kv/0.1 inch) to minimize arcing within the capacitor.

The ester oils of the present invention are also suitable for use in transformers. Transformer oils must possess the ability to maintain high dielectric or insulating strengths within the transformer and the ability to transfer heat away from the electrical components, and they must remain stable to oxidation and degradation for long periods of time. In addition, once they are degassed immediately prior to service, such oils should present the minimum tendency toward the formation of additional gas (commonly hydrogen) while in service.

Additional electrical applications of the esters of this invention include their use in switch gear, electrical cables, and other electrical apparatus.

The present invention is illustrated by the following examples, which include preferred embodiments.

EXAMPLE 1

The preparation of a pentaerythritol ester of a mixture of benzoic acid and mixed $C_5$, $C_7$ and $C_9$ normal aliphatic carboxylic acids was conducted as follows:

Technical pentaerythritol (2moles, 292 g), benzoic acaid (2.1 moles, 256 g) and mixed aliphatic acids (6.3 moles, 794 g) were mixed together with 23.6 g of Darko KB activated carbon and toluene (54 cc, 46 g) in a 3-necked round bottomed glass reaction vessel fitted with heater, stirrer and Dean-Stark type reflux condenser. The mixed aliphatic acids consisted of 35% n-$C_5$, 50% n-$C_7$, and 15% n-$C_9$ aliphatic carboxylic acids. The reactants were heated under nitrogen blanket to reflux and the pot temperature was raised to 425°F. The total amount of water removed in 30 hours was 153 cc which compared with 157 cc for theoretical reaction. After the water of reaction was removed, a further 15% excess (137 g) of the n-$C_5$, n-$C_7$ and n-$C_9$ mixed acids was added and the reaction was continued for 7 hours in order to drive the reaction to completion, an additional 6 cc of water being removed in this further reaction. Unreacted acid and toluene were removed by vacuum stripping at 425°F. under vacuum (10–30 mm Hg pressure). Calcium oxide (3 wt. % based on theoretical yield of ester) was then stirred for ½ hour to remove further excess acid. The final product was filtered with the help of 2 wt. % filter aid, based on ester and was then percolated through Attapulgus clay. Finished ester yield was 998 g which is 84.5% of theoretical. The finished ester had a hydroxyl number of 2.35 mg KOH/g. The ester is designated Oil A. Analysis by nuclear magnetic resonance spectroscopy (NMR analysis) indicated that 20 mole % of the ester was benzoic acid ester. The ester obtained in this example is designated Oil A in the evaluations given below.

EXAMPLE 2

Following the procedure of Example 1, including the staged addition of excess aliphatic acid to assist in driving the reaction to completion, dipentaerythritol (DIPE) was esterified with a mixture of benzoic acid and valeric acid. Two preparations were made, using different proportions of benzoic acid. Reactant proportions and yield are shown below, the esters obtained being designated Oil B and Oil C, respectively.

|  | Oil B | | Oil C | |
|---|---|---|---|---|
|  | Moles | Wt. | Moles | Wt. |
| DIPE (taken as 100%) | 1.5 | 381 g | 0.59 | 150 g |
| Benzoic Acid | 0.9 | 109.8 g | 1.18 | 144 g |
| n Valeric Acid | 8.1 | 826.2 g | 2.37 | 242 g |
| n Valeric Acid | 1.35 excess | 137.7 g | 0.52 | 53 g |
| Darko KB | | 23 g | | 9.4 g |
| Toluene | | 46 cc | | 46 cc |
| Product Yield | | 920 g | | 343 g |

NMR analysis indicates 5.5 mole % benzoic acid was incorporated into Ester B and 24 mole % into Ester C. After clay treatment, the oils had the following properties:

|  | ASTM Method | Oil B | Oil C |
|---|---|---|---|
| Flash Point °F. | D92 | 535 | 545 |
| Fire Point °F. | D92 | 595 | 615 |
| Pour Point °F. | D97 | −55 | −15 |
| Kin. Vis. cs at 210°F. | D88 | 9.76 | 16 |
| Kin. Vis. cs at 77°F. | D88 | 140 | 583.1 |
| Specific Gravity 60/60°F. | D901 | 1.0514 | 1.0905 |

Electrical test results on the esters of Examples 1 and 2 are given in Table I, which follows:

TABLE I

|  | ASTM Method | Oil A | Oil B | Oil C |
|---|---|---|---|---|
| Dielectric Constant (1000 v/60 Hz) | | | | |
| at 77°F. | D924 | 3.74 | 5.95 | 6.50 |
| at 194°F. | D924 | 3.50 | 5.97 | 6.52 |
| Specific Conductivity ohm $cm^{-1}$ | | | | |
| at 77°F. | D1169 | $3.06 \times 10^{-13}$ | $5 \times 10^{-12}$ | $7.1 \times 10^{-13}$ |
| at 194°F. | D1169 | $6.2 \times 10^{-12}$ | $8.7 \times 10^{-11}$ | $3.6 \times 10^{-11}$ |
| Dissipation Factor (tangent delta 5%) | | | | |
| at 77°F. | D924 | 0.25% | 0.99% | 0.33% |
| at 194°F. | D924 | 5.4% | — | 19.4% |
| Gassing Tendency microliters $H_2$/minute | D2300 | −20* | −20* | −26.3 |

*Approximate estimated value from curve plotted from ASTM D2300 readings versus aromatics concentration. The negative readings indicate that hydrogen is absorbed by the oil.

COMPARATIVE TESTS

Following the procedure of Example 1 a pentaerythritol ester of mixed $C_5$ to $C_9$ normal aliphatic carboxylic acids was prepared (Ester X). The average molecular weight of the mixture was 123.4. In the same manner a dipentaerythritol ester of mixed $C_5$ to $C_{10}$ normal aliphatic carboxylic acids was prepared (Ester Y). This mixture had an average chain length of 6.2 carbon atoms. These esters had the following properties:

| Test | ASTM Method | PE Ester X | DIPE Ester Y |
|---|---|---|---|
| Flash Point °F. | D92 | 500 | 555 |
| Fire Point °F. | D92 | 615 | 615 |
| Pour Point | D97 | −75 | −50 |
| Kin. Vis. cs at 210°F. | D88 | 5.1 | 9.0 |
| Kin. Vis. cs at 77°F. | D88 | 39.1 | 110.4 |
| Specific Gravity 60/60°F. | D901 | 0.9891 | 1.0125 |

The gassing tendencies of these esters were compared with the gassing tendency of the DIPE ester of mixed benzoic-valeric acid (Oil C of Example 2) using Procedure B of ASTM D-2300. The results obtained which are given in Table II show that the ester of a mixture of aliphatic and aromatic acids is superior in its antigassing tendency.

TABLE II

Gassing Tendencies of Electrical Oils

|  | Microliters $H_2$/Min.* |
|---|---|
| PE ester $C_5$–$C_9$ acids | +29 |
| DIPE ester $C_5$–$C_{10}$ acids | +23 |
| DIPE ester mixed benzoic-valeric acids (Oil C) | −26.3** |

*ASTM D-2300 (Procedure B).
**The negative reading signifies that hydrogen is absorbed by the oil.

Several oils outside the scope of this invention were evaluated for their electrical properties. These were:

| Oil | |
|---|---|
| P | $CH_3OCO(CH_2)_5OCOCH_3$ |
| Q | $C_2H_5COOCH_2CH_2$—O—$CH_2CH_2OCOC_2H_5$ |
| R | $C_2H_5OCH_2CH_2$—O—$CH_2CH_2OC_2H_5$ |
| S | $C_2H_5OCH_2CH_2$—O—$CH_2CH_2OCOCH_3$ |
| T | $(C_2H_5OCH_2CH_2O)_2CH_2$ |
| U | $(C_2H_5OCH_2CH_2O)_2C(CH_3)$ |

Each oil was purified by fractional distillation, using the 50% middle cut for testing, and clay treating the cut before use. Only in the case of Oils T and U was the dissipation factor (tangent delta %) low enough (<110%) to be measured by the Schering Bridge (ASTM D924). Even Oils T and U had unsatisfactory high dissipation factors as shown below.

| | 1000 V/60 $H_2$ at 25°C. | |
|---|---|---|
| Oil | Dielectric Constant | Dissipation Factor tan delta % |
| T | 9.3> | 89% |
| U | 4.69 | 27% |

BIOLOGICAL TESTS

Since there are no standard tests in this category for electrical oils, tests recommended by, or approved by the Environmental Protection Agency (EPA) were used. The oils were tested qualitatively for biodegradation using a ubiquitous microorganism and for acute toxicity to two species of fish. The tests were conducted by a professional industrial laboratory.

The biodegradation test consists of adding the oil at concentrations ranging from $10^{-1}$ to $10^{-7}$ to a standard broth containing the microorganism E. Coli (ATCC No. 11229). After incubation, the samples are tested for microbial growth or lack of growth. Growth indicates in a qualitative manner that the oil is nontoxic to the microorganism and that it can be used as food by the microorganism. The test results indicated that all of the DIPE, PE and similar esters are biodegradable at all dilutions. It is estimated that polychlorinated biphenyls, both by refractory action and toxicological action would show growth inhibition at the 1/10 to 1/100 concentration level.

Acute toxicity tests were conducted on fresh water fish using the EPA method: "Fish Pesticide Acute Toxicity Guidelines." Two species of fish were used, namely rainbow trout and blue gill sunfish. These species are sensitive to water-borne toxicants and represent cold water, top water dwellers (trout) and temperate water, bottom dwellers (blue gills). The dipentaerythritol esters of mixed aromatic/aliphatic acids were found to have unexpectedly very low orders of toxicity, there being no deaths of blue gill sunfish even after 96 hours at concentrations of 500,000 parts per million with Oil C of Example 2. This oil was less toxic than a dipentaerythritol ester of mixed $C_5$ to $C_{10}$ normal aliphatic monocarboxylic acids (Ester Y) which in turn was less toxic than a refined mineral oil made up of 90% refined paraffinic/naphthenic lubricating oil base stock and 10% bright stock. The results obtained are given in Table III, which follows. The values given are for the lethal concentrations of each material for 50% mortality. The table also includes data from the literature on the toxicity of polychlorinated biphenyls. No numbers appear for Oil C since no deaths of fish occurred, the testing laboratory concluding that since the oil was not lethal to fish in concentrations up to 500,000 ppm, further studies were considered unnecessary.

TABLE III

ACUTE TOXICITY STUDIES ON FRESH WATER FISH[1]
$LC_{50}$[2] ppm

| | Trout | | | Blue Gills | | |
|---|---|---|---|---|---|---|
| | 24 Hrs. | 48 Hrs. | 96 Hrs. | 24 Hrs. | 48 Hrs. | 96 Hrs. |
| Oil Y | 245,000 | 133,000 | 115,000 | 560,000 | 396,000 | 354,000 |
| Refined Mineral Oil | 16,400 | 10,100 | 3,800 | 76,000 | 63,000 | 12,600 |
| PCB[3] (After several weeks' exposure) | | 8 ppb | | | 20–50 ppb | |
| Oil C | | Not tested | | | Not toxic[4] | |

[1]Test conducted by an industrial laboratory, using EPA method, "Fish Pesticide Acute Toxicity Guidelines."
[2]Statistical Method used - Litchfield, V.T.; Wilcoxon, F., "Journal of Pharmacology and Experimental Therapeutics," 96, 99 (1949). $LC_{50}$ is lethal concentration for 50% mortality.
[3]Science, Vol. 175, p. 156 (January 14, 1972). (Reporting work by Stallings on blue gills, catfish, trout and shrimp; ppb = parts per billion).
[4]Not toxic to blue gill sunfish even after 96 hours at concentrations up to 500,000 parts per million.

In a representative application of an oil of this invention, Oil B is used as the impregnant in a capacitor constructed with two sheets of density 1.0 Kraft capacitor tissue, each of about 0.45 mil nominal thickness, employed as the dielectric material between aluminum foil electrodes. Prior to impregnation the capacitors are dried under vacuum, and then they are impregnated with the degassed ester oil under vacuum. The liquid in the electrical field of the impregnated capacitor is approximately 35 percent by volume.

The scope of this invention is to be determined by the appended claims. There is no intention that the scope be limited to the foregoing specific examples presented by way of illustration.

What is claimed is:

1. An electrical insulating oil comprising a fully esterified ester of:
   a. a mixture of about 1 to 50 mole % of a $C_7$ to $C_{14}$ aromatic monocarboxylic acid and about 99 to 50 mole % of a $C_4$ to $C_{14}$ aliphatic monocarboxylic acid, and
   b. a polyhydric alcohol selected from the group consisting of a $C_3$ to $C_6$ polyol of from 3 to 6 carbon atoms and having 2 to 4 hydroxyl groups, and a polyol ether of from 8 to 40 carbon atoms and having 2 to 12 hydroxyl groups and 1 to 5 ether groups.

2. An electrical insulating oil as defined by claim 1 which comprises an ester of pentaerythritol.

3. An electrical insulating oil as defined by claim 1 which comprises an ester of polypentaerythritol.

4. An electrical insulating oil as defined by claim 3 wherein said ester is an ester of dipentaerythritol.

5. An electrical insulating oil as defined by claim 1 wherein said mixture of acids includes benzoic acid.

6. An electrical insulating oil as defined by claim 1 wherein said acid mixture includes a mixture of aliphatic monocarboxylic acids.

7. A method for improving the operation of an electrical device which comprises using as an electrical insulating oil therefor an ester defined by claim 1.

8. An electrical device containing as a dielectric medium the ester defined by claim 1.

9. An electrical insulating oil as defined by claim 1 wherein the mole percent of aromatic monocarboxylic acid in said mixture of aromatic monocarboxylic acids and aliphatic monocarboxylic acids is within the range of about 1 to 30 mole %.

10. An electrical insulating oil as defined by claim 1 wherein said ester is of a mixture of polyhydric alcohol and polyol ether.

* * * * *